United States Patent [19]

Gall

[11] 4,039,029
[45] Aug. 2, 1977

[54] RETREATMENT OF WELLS TO REDUCE WATER PRODUCTION

[75] Inventor: James W. Gall, Bartlesville, Okla.

[73] Assignee: Phillips Petroleum Company, Bartlesville, Okla.

[21] Appl. No.: 629,355

[22] Filed: Nov. 6, 1975

[51] Int. Cl.² .................. E21B 33/138; E21B 43/22
[52] U.S. Cl. .................. 166/294; 166/270; 166/273
[58] Field of Search .......... 166/294, 295, 281, 270, 166/273, 274, 300

[56] References Cited

U.S. PATENT DOCUMENTS

| | | | |
|---|---|---|---|
| 3,308,885 | 3/1967 | Sandiford | 166/295 |
| 3,396,790 | 8/1968 | Eaton | 166/270 |
| 3,613,790 | 10/1971 | Stout et al. | 166/295 X |
| 3,687,200 | 8/1972 | Routson | 166/295 X |
| 3,762,476 | 10/1973 | Gall | 166/294 |
| 3,785,437 | 1/1974 | Clampitt et al. | 166/294 X |
| 3,809,160 | 5/1974 | Routson | 166/294 |
| 3,833,061 | 9/1974 | Gall | 166/294 |

Primary Examiner—Stephen J. Novosad

[57] ABSTRACT

A process is provided for reducing water production in production oil wells or for altering the water permeability profile of injection wells that have been previously treated with partially gelled or ungelled polymer and from which oil has been produced for a period of time subsequent to the treatment. The retreatment is made by injecting into the formation an ionic solution capable of crosslinking residual ungelled polymer in the formation and thereafter injecting into the formation an aqueous solution of polymer capable of being crosslinked by the ionic solution. In a preferred embodiment aluminum citrate is injected into an underground formation that has previously been treated with an ungelled polymer selected from among polyacrylamides, partially hydrolyzed polyacrylamides, polysaccharides, carboxymethylcellulose, polyvinyl alcohol, polystyrene sulfonates, and the like, with the aluminum citrate being followed with a solution of an at least partially ungelled polymer selected from those above named.

10 Claims, No Drawings

RETREATMENT OF WELLS TO REDUCE WATER PRODUCTION

BACKGROUND OF THE INVENTION

The invention relates to a method for correcting the water permeability of a subterranean formation penetrated by a well bore. In one aspect this invention relates to prolonging or reestablishing mobility control and/or plugging of a subterranean formation penetrated by a well bore. In another of its aspects this invention relates to the gelation of residual ungelled polymer solution in an underground formation.

There are various techniques known to the art for treating underground formations with ungelled polymer solutions to correct the water permeability of the formations. Known processes include the flooding of the formation with ungelled polymer, the injection of partially gelled polymer into a formation, and the injection of ungelled polymer in combination with the injection of gelling agent either simultaneously or in alternating slugs. In most of these processes there is residual ungelled polymer in the formation when production is resumed through the well bore. It is an object of this invention advantageously to use this residual ungelled polymer in a subsequent retreatment of the underground formation to prolong or to reestablish mobility control of the formation. Stated in another way, it is also an object of this invention to provide a method for controlling the mobility and/or plugging of a subterranean formation penetrated by a well bore which has been previously treated with a partially gelled polymer or an ungelled polymer solution.

Other objects, aspects, and the various advantages of this invention will become apparent upon reading this specification and the appended claims.

STATEMENT OF THE INVENTION

Broadly, the retreating of a subterranean formation which has been returned to production after having been previously treated with a partially gelled polymer or an ungelled polymer is provided by injecting into the formation, either through an injection well or a production well penetrating the formation, an ionic solution capable of crosslinking residual ungelled polymer in the formation and subsequently injecting into the formation an aqueous solution of polymer capable of being crosslinked by the ionic solution. The ionic solution advantageously crosslinks at least a portion of the ungelled polymer that penetrated the formation in the previous treatment and the newly injected polymer solution is crosslinked in situ by the ionic solution thus building, in conjunction with the polymer from the previous treatment, gels having high residual resistance factor to the mobility of aqueous liquid while having little effect on the residual resistance factor to hydrocarbons.

In an embodiment of the invention the subterranean formation can be flushed with a slug of fresh water prior to the injection of the crosslinking agent so that all polymer except that adsorbed on the surface of the formation will be removed. Reaction of the crosslinking agent and the newly injected ungelled polymer with the polymer adsorbed on the surface of the formation should produce a gel tightly held within the formation interstices.

In another embodiment of the invention partially crosslinked or partially gelled polymer can be injected into the formation as the ungelled polymer solution. The use of partially crosslinked polymer is most appropriate in highly permeable, fractured formations. The higher viscosity of the partially crosslinked material makes penetration of the formation matrix more difficult causing solutions of partially crosslinked polymer preferentially to enter the highly permeable fractures of the formation.

For the purposes of this invention, "residual resistance factor" to a specific material such as aqueous liquid is defined as the mobility of the material in the formation before treatment, divided by the mobility of the material in the formation after treatment. Reference will be made to the residual resistance factor to aqueous liquid and the residual resistance factor to hydrocarbon.

In the process of the invention the gelling agent or crosslinking agent used to crosslink the residual polymer will depend upon the crosslinkable polymer with which the formation has been previously treated. In general it can be stated that any gelling agent capable of gelling the polymer with which the formation was previously treated is suitable for the process of this invention and the gellable polymer that will be injected into the formation can be any polymer that is capable of being gelled by the crosslinking agent injected.

Generally, the polymers with which the formation will have been treated prior to retreatment by this invention will have been selected from the group consisting of polyacrylamides, partially hydrolyzed polyacrylamides, polyacrylonitrile, partially hydrolyzed polyacrylonitriles, polyacrylic acid, polyvinyl pyrrolidone, polysaccharides, carboxymethylcellulose, other substituted celluloses, polyvinyl alcohol, polystyrene sulfonates, copolymers of acrylonitrile with acrylic acid or 2-acrylamido-2-methyl-1-propane sulfonic acid, and the like.

Additional polymers that are suitable for use in the method of the invention are: copolymers of acrylamide and acrylic acid or other vinylic or polyolefinic monomers; partially hydrolyzed copolymers of acrylamide and acrylic acid or other vinylic or polyolefinic monomers, copolymers of acrylonitrile and acrylic acid or other vinylic or polyolefinic monomers; partially hydrolyzed copolymers of acrylonitrile and acrylic acid or other vinylic or polyolefinic monomers; copolymers of acrylic acid and other vinylic or polyolefinic monomers; partially hydrolyzed copolymers of acrylic acid and other vinylic or polyolefinic monomers; methylolated or sulfomethylolated forms of the above.

Crosslinking ionic solutions suitable for use with these polymers will have from about 25 ppm to about 10,000 ppm of a multivalent cation selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$, complexed with from about 25 to about 10,000 ppm of retarding anion selected from the group consisting of acetate, nitrilotriacetate, tartrate, citrate, tripolyphosphate, metaphosphate, gluconate, phosphate, and the like.

The polymers that will be injected into the formation will be the same as that of the previous treatment or any of the others selected from the list of polymers above. In an underground formation treatment by this process the polymer solutions used in the treatment can be from about 100 barrels to about ½ of a pore volume for a treatment slug. The polymer solutions can have a polymer concentration of from about 50 to about 10,000 pm depending upon the viscosity desired. Inert materials such as ground walnut hulls, asbestos, leather, etc., can be added to the polymer solutions and act as filler or backbone for a filter cake so that good blockage of water without blockage of hydrocarbons can be produced.

Essentially the improved method of this invention consists of injecting a slug of crosslinking metal ion followed by a slug of water-soluble polymer into a well which has been previously treated with a partially gelled polymer or an ungelled polymer and which has been put back in operation for a substantial period of time such as about six months or more. The two successive slugs interact with the residual polymer from the original treatment to give the desired resistance to the flow of brine. Such a process has been simulated in the laboratory as is presented in the following example. This example is meant to be exemplary and not to be taken as exclusive.

EXAMPLE I

Cores were treated with a 250 ppm solution of Dow Pusher 700, a partially hydrolyzed polyacrylamide, both in the presence and the absence of a residual oil saturation. The cores were then flushed with water to remove all but the adsorbed polymer. This flush was then followed with a slug of aluminum citrate (270 ppm Al) in water, a slug of water, and finally another slug of polymer. Thus, this procedure only permitted interaction of the fresh polymer with retained material such as would be present in a formation that has been treated with a polymer and then production of water injection resumed for some time before the retreatment. The flush of water before injection of the aluminum citrate and the flush of water following the injection of aluminum citrate were not essential to the invention and could be eliminated in the field. The following Table demonstrates the residual resistance factors generated in Berea cores by standard methods and by following with the retreatment method.

EXAMPLE II

This example demonstrates the beneficial effects of the inventive retreatment process on a well which had been previously treated with a partially hydrolyzed polyacrylamide to improve the oil/water ratio in a production well. It is well known in the art that partially hydrolyzed polyacrylamides can be pumped into subterranean oil-bearing formations for a period of 1-3 days to significantly increase the residual resistance factor to water without greatly affecting the residual resistance to oil. However, such treatment is effective for only several months, and it is at such a time that use of the retreatment process of this invention can be advantageous.

A well had previously been treated with 2000 barrels of brine solution containing 2000 ppm of a partially hydrolyzed polyacrylamide to give a residual resistance factor of 20. After about 8 months of elution with brine, the residual resistance factor had decreased to 2. At this point, the well is retreated according to this invention with 1000 barrels of aluminum citrate containing 500 ppm of aluminum ion followed by 1000 barrels of brine solution containing 500 ppm of a partially hydrolyzed polyacrylamide. The residual ressitance factor is now increased to 75 which is an improvement over the original treatment.

I claim:

1. A method for retreating a subterranean formation penetrated by at least one well bore, said formation having been previously treated by partially gelled or ungelled polymer and thereafter returned to production, said method comprising:
   a. injecting into the formation a crosslinking ionic solution capable of crosslinking residual ungelled polymer present in the formation from the previous treatment, and

TABLE I

| Run No. | After Standard Treatment | After Retreatment By Inventive Process | | |
|---|---|---|---|---|
| | 1 | 2 | 3 | 4 |
| | RRF to 1200 ppm TDS[a] in Water | RRF to 1200 ppm TDS Water | RRF to 88,000 ppm TDS Brine | RRF to Oil |
| 1 | 17 | 47 | 25 | — |
| 2 | 24 | 14,000 | 9,100 | — |
| 3 | 22 | 3,600 | 1,100 | — |
| 4 | 36 | 144 | 64 | 1.7 |
| 5 | 38 | 278 | 33 | 1.7 |

Column 1. RRF to 1,200 ppm TDS in water after first polymer slug (standard treatment)
Column 2. RRF to 1,200 ppm TDS in water after retreatment
Column 3. RRF to 88,000 ppm TDS in brine after retreatment
Column 4. RRF to oil after retreatment

[a]TDS represents Total Dissolved Solids

As seen in the table of data the retreatment gives substantially better results as evidenced by the residual resistance factors in column 2 being much larger than those in column 1. Comparing columns 3 and 1, it is seen that except for one case the final residual resistance factors to a stron brine are greater than the residual resistance factors to fresh water after the standard treatment. These data demonstrate another advantage of this method for retreating wells in that the retreated formations are more tolerant of strong brines and therefore will remain in place for a much longer time. The residual resistance factor to oil was measured in runs 4 and 5 and show a low residual resistance to oil.

Following is a calculated example showing the use of this invention in a field process for retreating an operating well.

b. injecting into the formation an aqueous solution of polymer capable of being crosslinked by said crosslinking solution.

2. A method of claim 1 wherein at least a portion of said crosslinking solution is injected along with said aqueous solution of polymer.

3. A method of claim 1 wherein said aqueous solution of polymer is injected after injection of said crosslinking agent is completed.

4. A method according to claim 1 wherein the aqueous polymer solution is comprised of from about 200 to about 10,000 ppm of polymer selected from the group consisting of polyacrylamides, partially hydrolyzed polyacrylamides, polyacrylonitrile, partially hydrolyzed polyacrylonitriles, polyacrylic acid, polyvinyl pyrrolidone, polysaccharides, carboxymethylcellulose, or substituted celluloses, polyvinyl alcohol, polystyrene sulfonates, copolymers of acrylonitrile with acrylic acid or 2-acrylamido-2-methyl-1-propane sulfonic acid; and the crosslinking ionic solution is comprised of from about 25 to about 10,000 ppm of multivalent cation selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$, and from about 25 to about 10,000 ppm of retarding ions selected from the group consisting of acetate, nitrilotriacetate, tartrate, citrate, tripolyphosphate, metaphosphate, gluconate, and ortho-phosphate.

5. A method according to claim 4 wherein the polymer solution used for retreatment is the same as the polymer solution previously used in treating the underground formation.

6. A method according to claim 4 wherein the polymer solution used for retreatment is not the same as the polymer solution previously used in treating the underground formation.

7. A method of claim 1 wherein the injecting of the crosslinking ionic solution into the underground formation is preceded by flushing the underground formation with fresh water.

8. The method of claim 1 wherein a fresh water flush is injected into the underground formation after the injection of the crosslinking ionic solution into the formation and before the injection of the aqueous solution of polymer.

9. A method for retreating a subterranean formation according to claim 1 wherein said retreating is carried out through a production well.

10. A method for retreating a subterrean formation according to claim 1 wherein said retreating is carried out through an injection well.

* * * * *